United States Patent

[11] 3,620,887

| [72] | Inventor | Victor R. Nelson<br>2700 S.W. Summit Drive, Lake Oswego, Oreg. 97034 |
|---|---|---|
| [21] | Appl. No. | 734,466 |
| [22] | Filed | June 4, 1968 |
| [45] | Patented | Nov. 16, 1971 |

[54] METHOD AND APPARATUS FOR ASSEMBLING VENEER PLIES INTO LAID-UP PLYWOOD PANELS
15 Claims, 24 Drawing Figs.

[52] U.S. Cl. .................................................. 156/563, 156/299, 156/560
[51] Int. Cl. ...................................................... B32b 31/10, B32b 31/20
[50] Field of Search........................................... 156/297, 299, 313, 353, 355–358, 362–364, 556, 558, 559–562, 563; 317/124

[56] References Cited
UNITED STATES PATENTS

| 2,366,588 | 1/1945 | Bolling ........................ | 156/558 |
|---|---|---|---|
| 2,407,070 | 9/1946 | Frame .......................... | 156/558 |
| 2,488,759 | 11/1949 | Bolling ........................ | 156/558 |
| 2,825,389 | 3/1958 | Stephens ..................... | 156/377 X |
| 2,890,675 | 6/1959 | Cheever ...................... | 156/562 X |
| 3,133,850 | 5/1964 | Alenius ....................... | 156/558 |
| 3,247,042 | 4/1966 | Denton et al. ............... | 156/313 X |
| 3,363,148 | 1/1968 | Freeman ..................... | 317/124 |
| 3,367,823 | 2/1968 | Clausen et al. .............. | 156/557 X |
| 2,970,634 | 2/1961 | Hantscho .................... | 156/477 X |

*Primary Examiner*—Benjamin A. Borchelt
*Assistant Examiner*—James M. Hanley
*Attorney*—Oliver D. Olson

ABSTRACT: Bottom veneer plies are arranged end to end and conveyed continuously under a core assembly unit where core strips are crowded together in edge-abutting relationship, trimmed to desired panel width and laid upon the bottom plies, after which overlay veneer plies are laid end to end over the core ply and the assembly conveyed to a cutoff unit where it is cut to plywood panel lengths for subsequent stacking and delivery to a press.

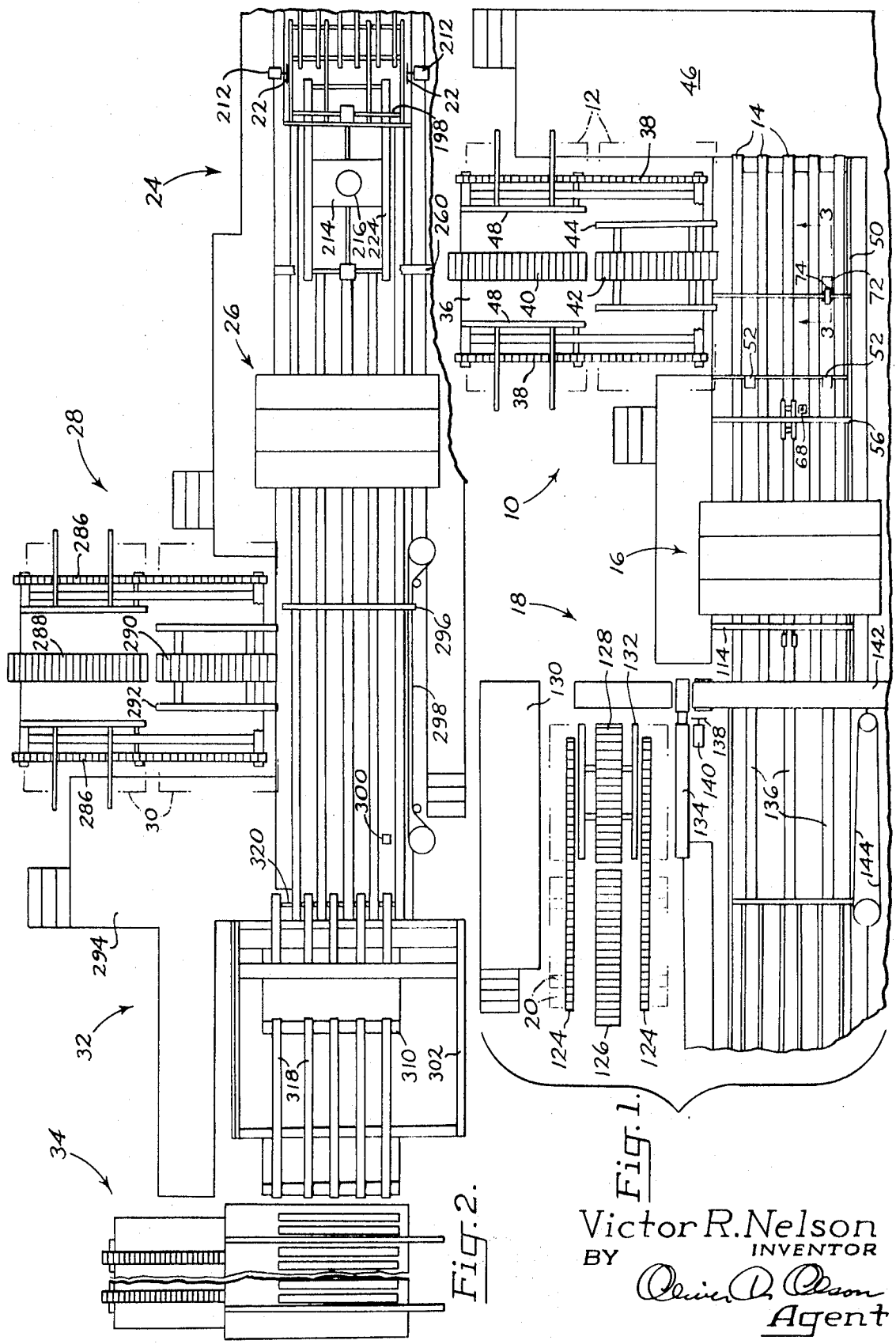

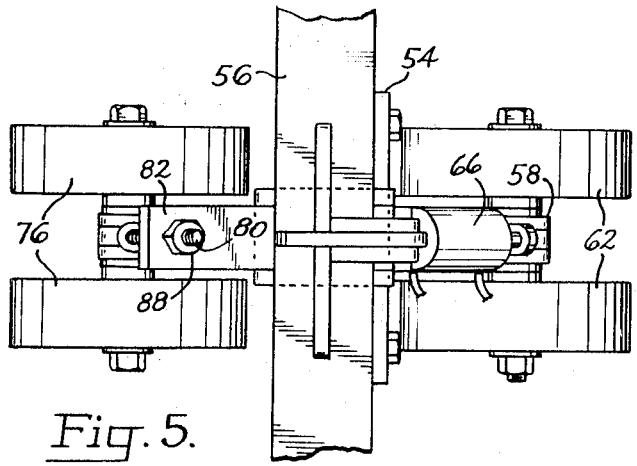
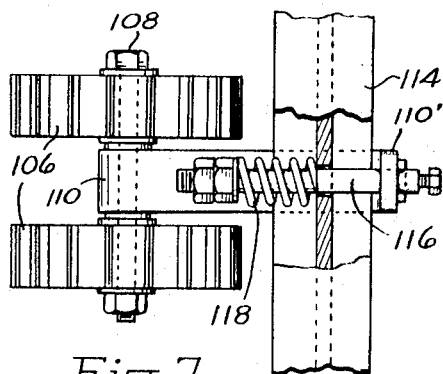
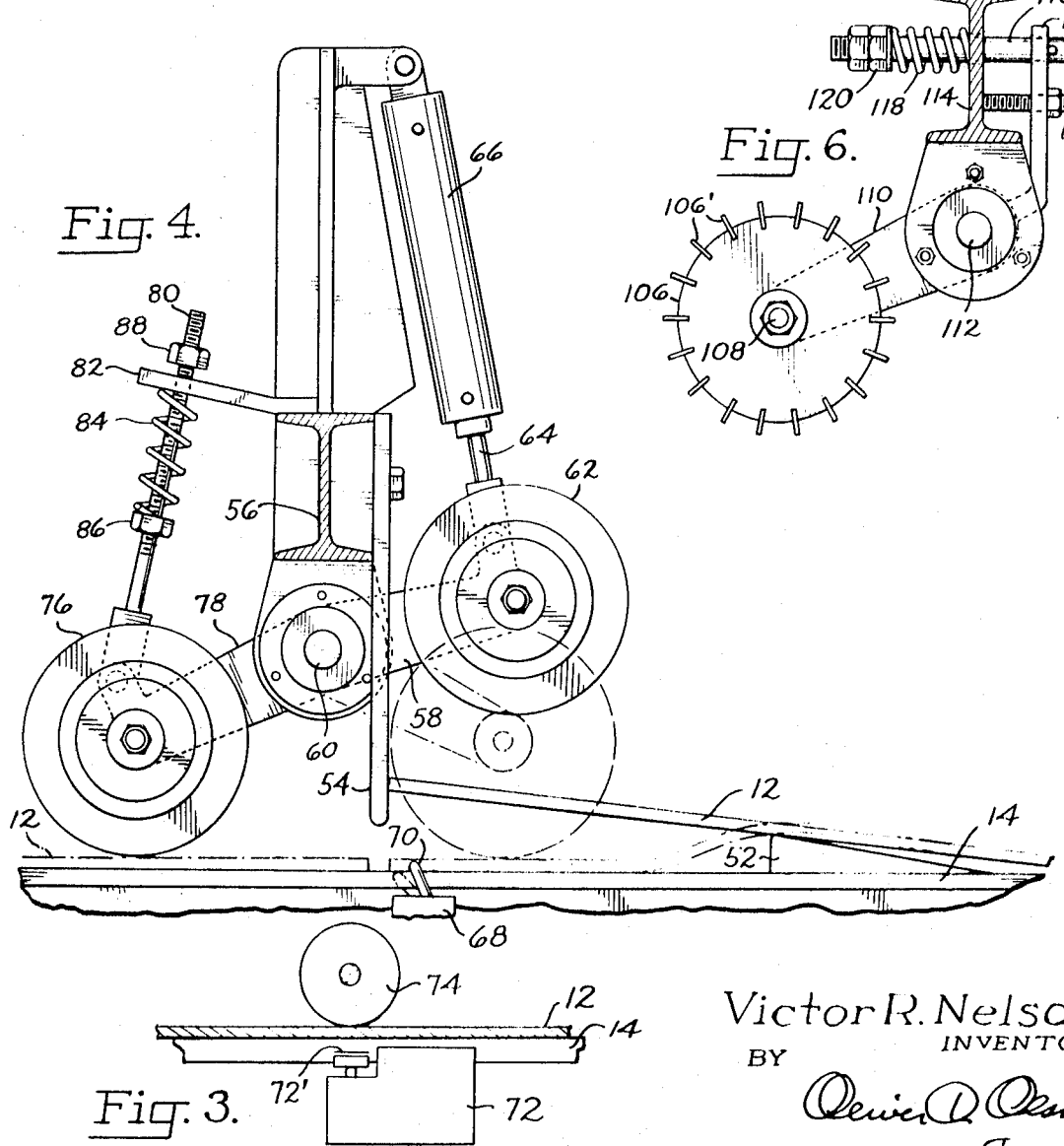
Victor R. Nelson
INVENTOR
BY
Oliver D. Olson
Agent

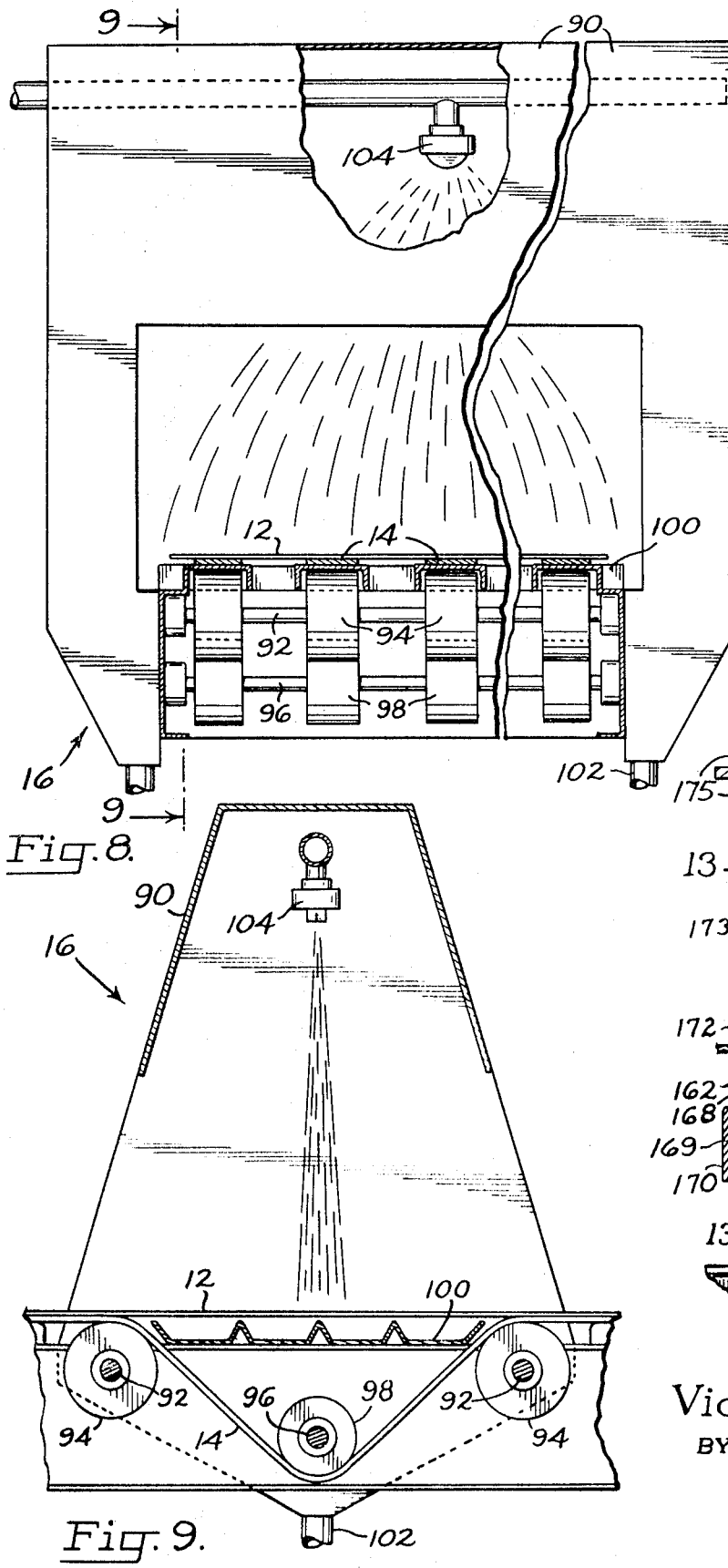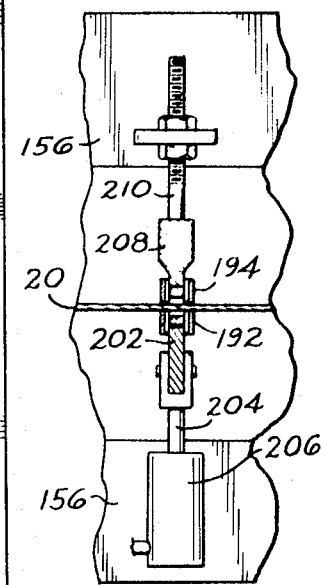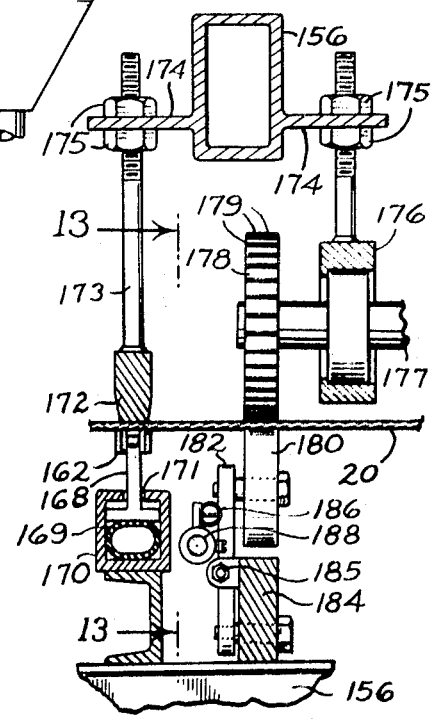

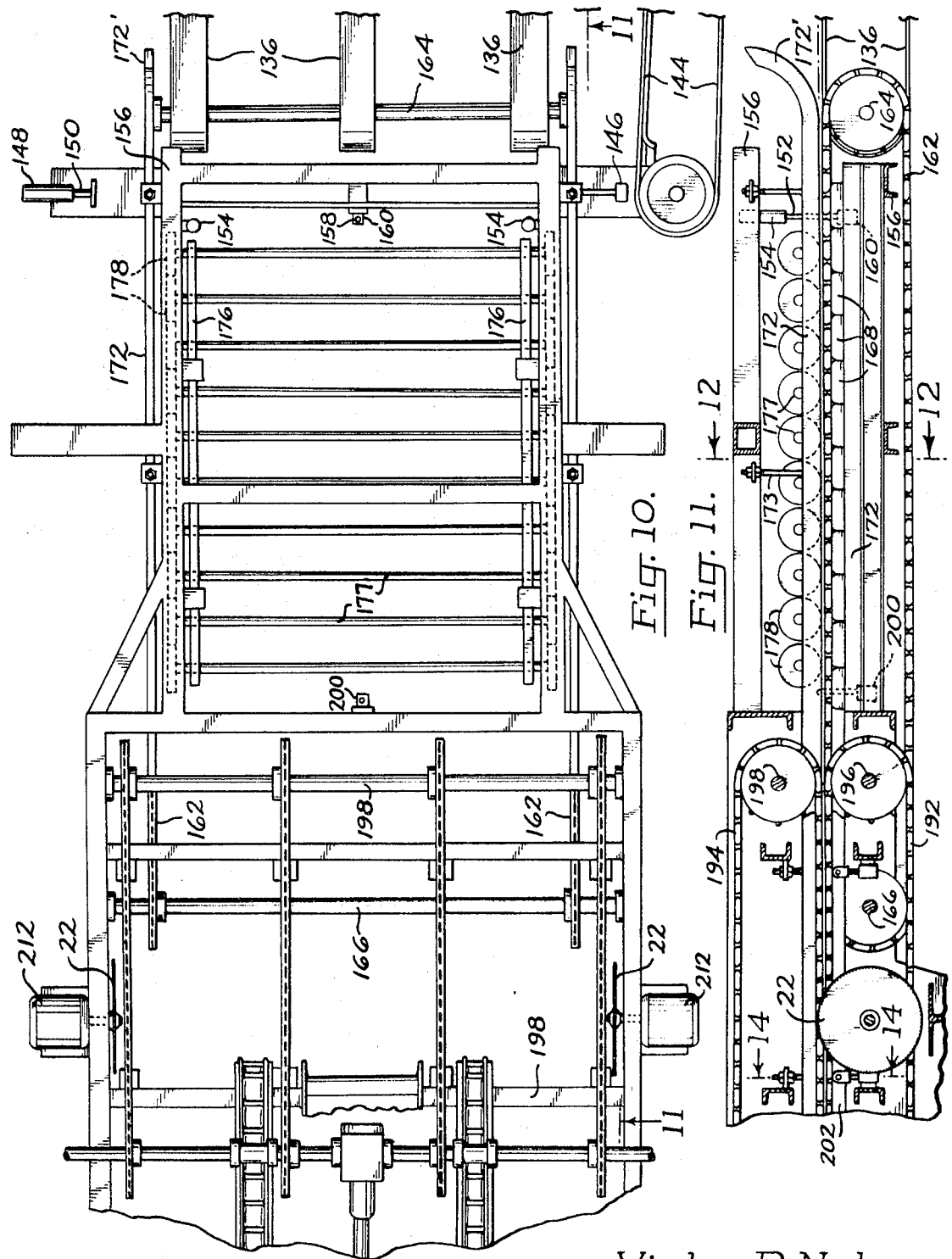

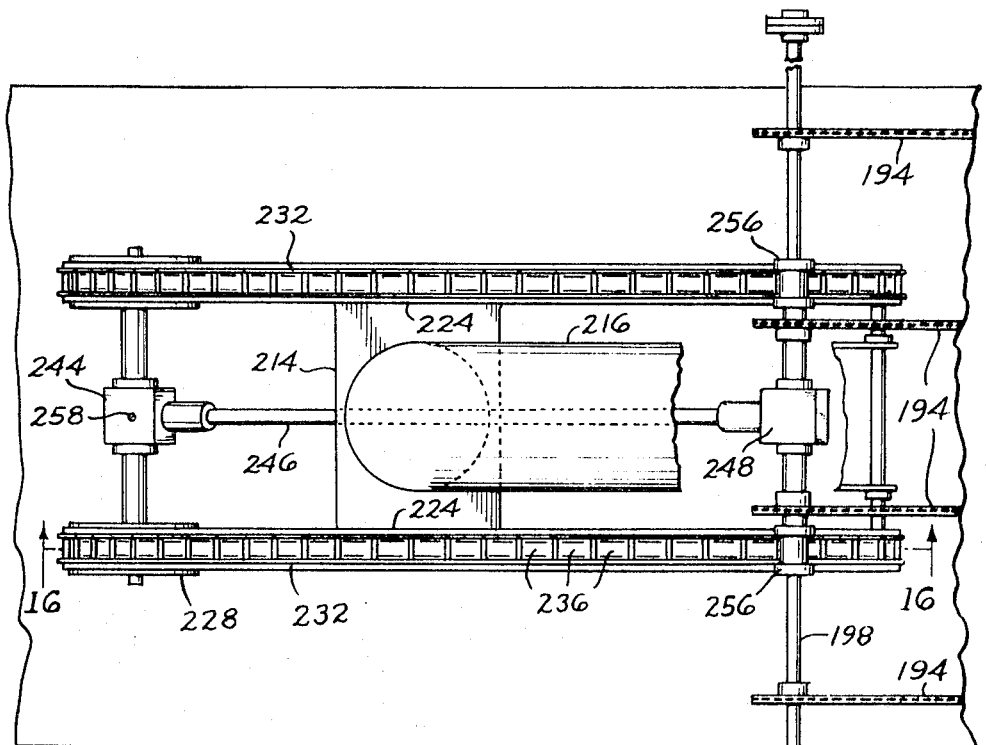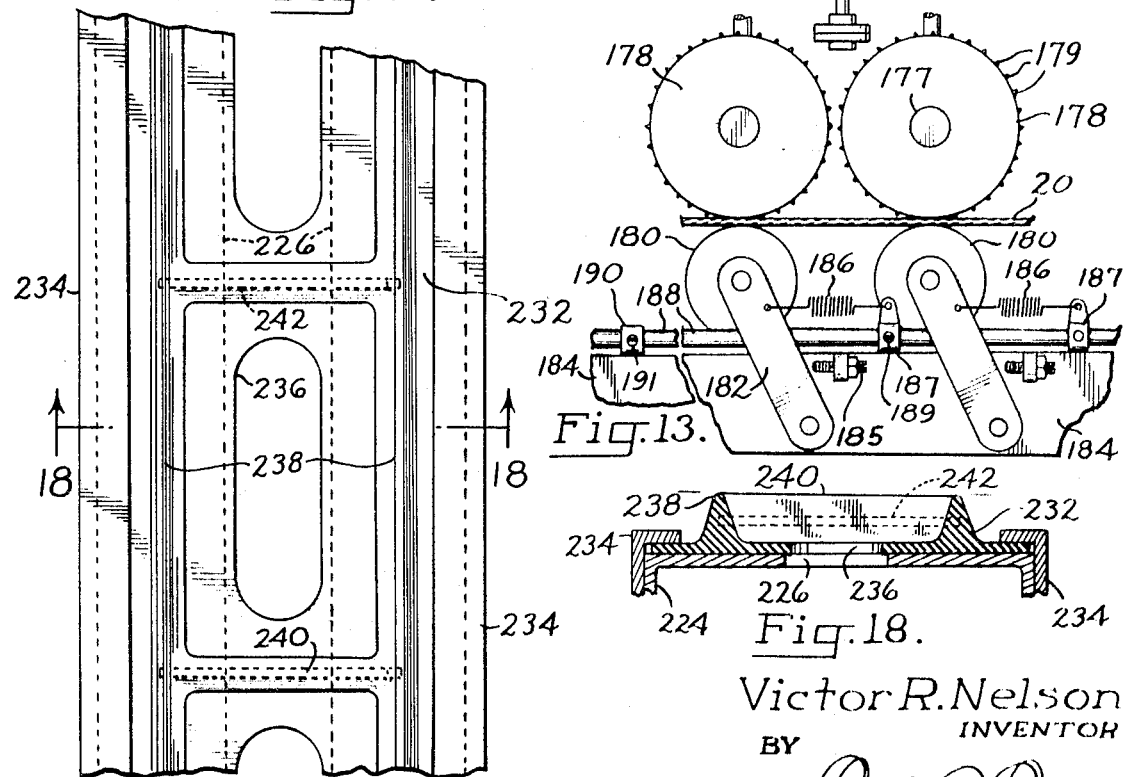

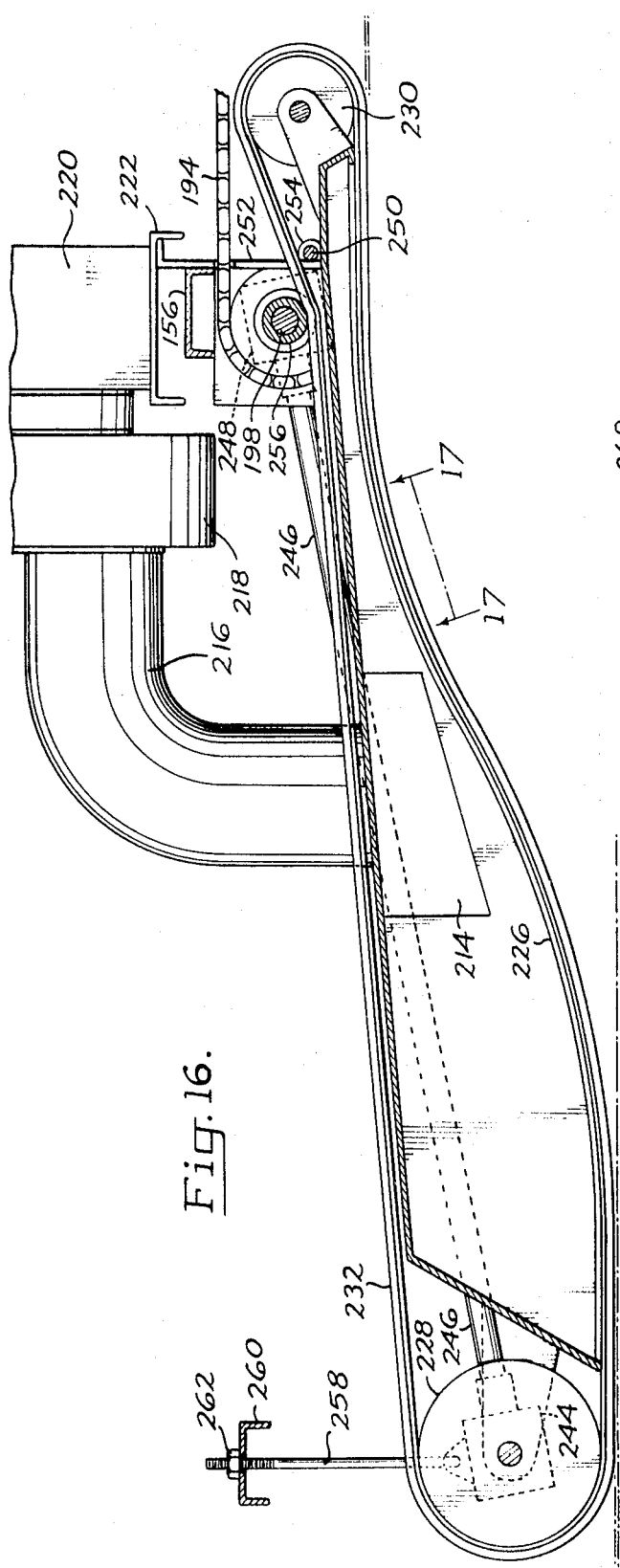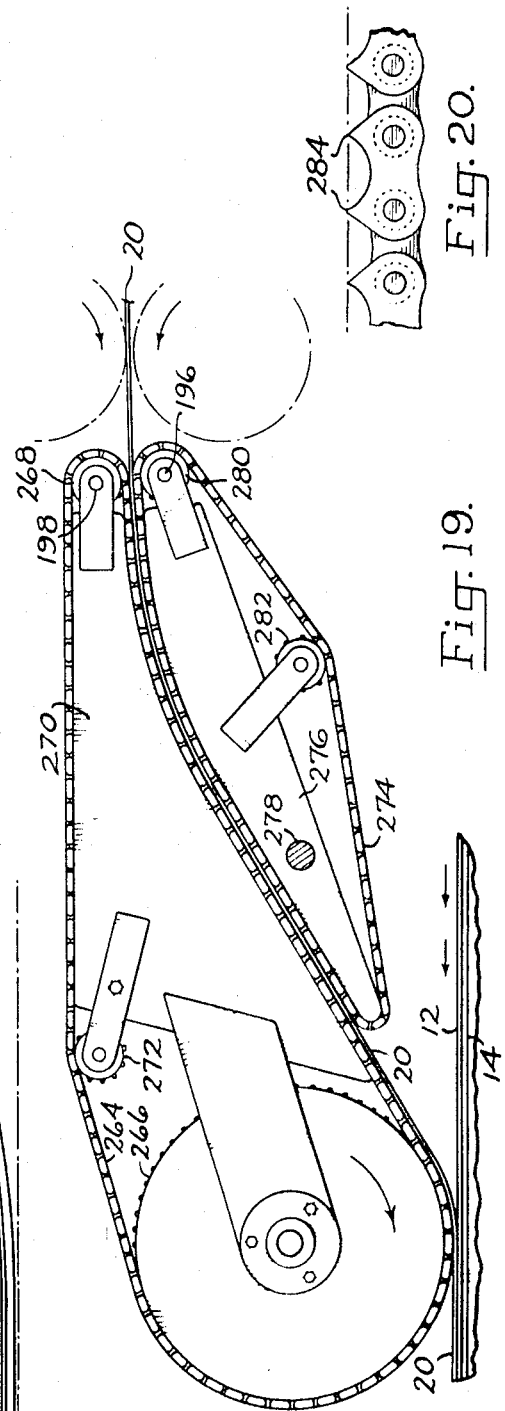
Fig.16.
Fig.19.
Fig.20.
Victor R. Nelson
INVENTOR
BY
Agent

Victor R. Nelson
INVENTOR
BY
Oliver A. Olson
Agent

METHOD AND APPARATUS FOR ASSEMBLING VENEER PLIES INTO LAID-UP PLYWOOD PANELS

BACKGROUND OF THE INVENTION

This invention relates to the manufacture of plywood, and more particularly to a method and apparatus for assembling veneer plies into laid-up plywood panels.

Heretofore veneer plies have been laid up at a single station by the step wise manual procedure of arranging over a bottom veneer ply strips of core veneer having bonding adhesive applied to their opposed surfaces, and then overlaying the core assembly with a top veneer ply. If five or seven ply panels are to be made, additional core and overlay plies are provided, as will be understood.

The foregoing procedure is slow and requires considerable manpower, thereby reflecting substantial cost of production. Moreover, since bonding adhesive is applied to the core strips by passing then lengthwise through rigid glue rolls, variations in thickness of the strips results in incomplete coating of the surfaces. Thus, each strip must be inspected and those incompletely coated must be discarded. Inspection time, and wasted core strip and adhesive materials add significantly to production costs.

Efforts have been made heretofore to automate plywood production with the view toward minimizing costs and increasing production. One such effort has involved the assembly of veneer core strips into a continuous sheet by joining them together in edge-abutting relationship before assembly with bottom and top plies. Such joining has been accomplished by applying adhesive tape along the side edges of the strips, or by embedding string frictionally in grooves provided at the side edges of the strip. Both procedures are wasteful of material since the edge portions carrying the tape or string, as well as the veneer bonding adhesive applied to the opposed surfaces of the strip, must be cut away and discarded.

SUMMARY OF THE INVENTION

In its basic concept the present invention involved the continuous deposit, upon continuously conveyed bottom veneer plies arranged end-to-end, of pretrimmed core strips arranged freely in edge-abutting relationship to form a continuously moving core sheet, overlaying the core sheet with top veneer plies arranged end to end in alignment with the ends of the bottom veneer plies, and cutting the assembly transversely along the adjacent ends of the top and bottom plies to form panel assemblies.

It is by virtue of the foregoing basic concept that the primary objective of the present invention is achieved, namely to overcome the disadvantages of prior procedures as discussed hereinbefore and to produce plywood at maximum production speed and minimum cost.

Another important object of the present invention is the provision of a veneer layup method and apparatus which are adaptable to the production of plywoods having varying numbers of plies.

Still another important object of this invention is the provision of veneer layup apparatus in the form of modular units which may be assembled in various arrangements to produce plywoods having varying numbers of plies.

A further important object of the present invention is the provision in veneer layup apparatus of the class described, of means for arranged core veneer strips freely in edge-abutting relationship to form a substantially continuous core sheet, and for continuously depositing said core sheet onto bottom veneer plies arranged end to end while substantially maintaining said edge-abutting relationship.

A still further important object of this invention is the provision in veneer layup apparatus of the class described, of a novel cutoff saw unit for cutting the continuously moving laid-up veneer assembly transversely into plywood panels of desired lengths.

The foregoing and other objects and advantages of the present invention will appear from the following detailed description, taken in connection with the accompanying drawings of the preferred embodiments.

BRIEF DESCRIPTION OF THE DRAWINGS

FIGS. 1 and 2 are fragmentary plan views of veneer layup apparatus embodying the features of the present invention, the left end of FIG. 1 being continued at the right end of FIG. 2.

FIG. 3 is a fragmentary sectional view taken on the line 3—3 in FIG. 1 illustrating means for applying a light-sensitive patch to the underside of bottom veneer plies, for subsequent use in actuating the cutoff unit.

FIGS. 4 and 5 are fragmentary side and plan views, respectively, of bottom veneer ply indexing and holddown means preceding the initial glue spray apparatus.

FIGS. 6 and 7 are fragmentary side and plan views, respectively, of bottom veneer ply holddown means following the initial glue spray apparatus.

FIG. 8 is a foreshortened end elevation, partly in section, of the initial glue spray apparatus.

FIG. 9 is a sectional view taken on the line 9—9 in FIG. 8.

FIG. 10 is a fragmentary plan view of the core assembly unit of the apparatus.

FIG. 11 is a fragmentary sectional view taken on the line 11—11 in FIG. 10.

FIG. 12 is a fragmentary sectional view taken on the line 12—12 in FIG. 11.

FIG. 13 is a fragmentary sectional view taken on the line 13—13 of FIG. 12.

FIG. 14 is a fragmentary sectional view taken on the line 14—14 in FIG. 11.

FIG. 15 is a fragmentary plan view of the core transfer unit of the apparatus.

FIG. 16 is a fragmentary sectional view taken on the line 16—16 in FIG. 15.

FIG. 17 is a fragmentary plan view as viewed in the direction of the arrows 17—17 in FIG. 16.

FIG. 18 is a fragmentary sectional view taken on the line 18—18 in FIG. 17.

FIG. 19 is a fragmentary sectional view, similar to FIG. 16 but showing an alternative form of construction of the core transfer unit.

FIG. 20 is a fragmentary side elevation showing structural details of a portion of a core transfer conveyor chain employed in the embodiment illustrated in FIG. 19.

DESCRIPTION OF THE PREFERRED EMBODIMENTS

Figure 21:
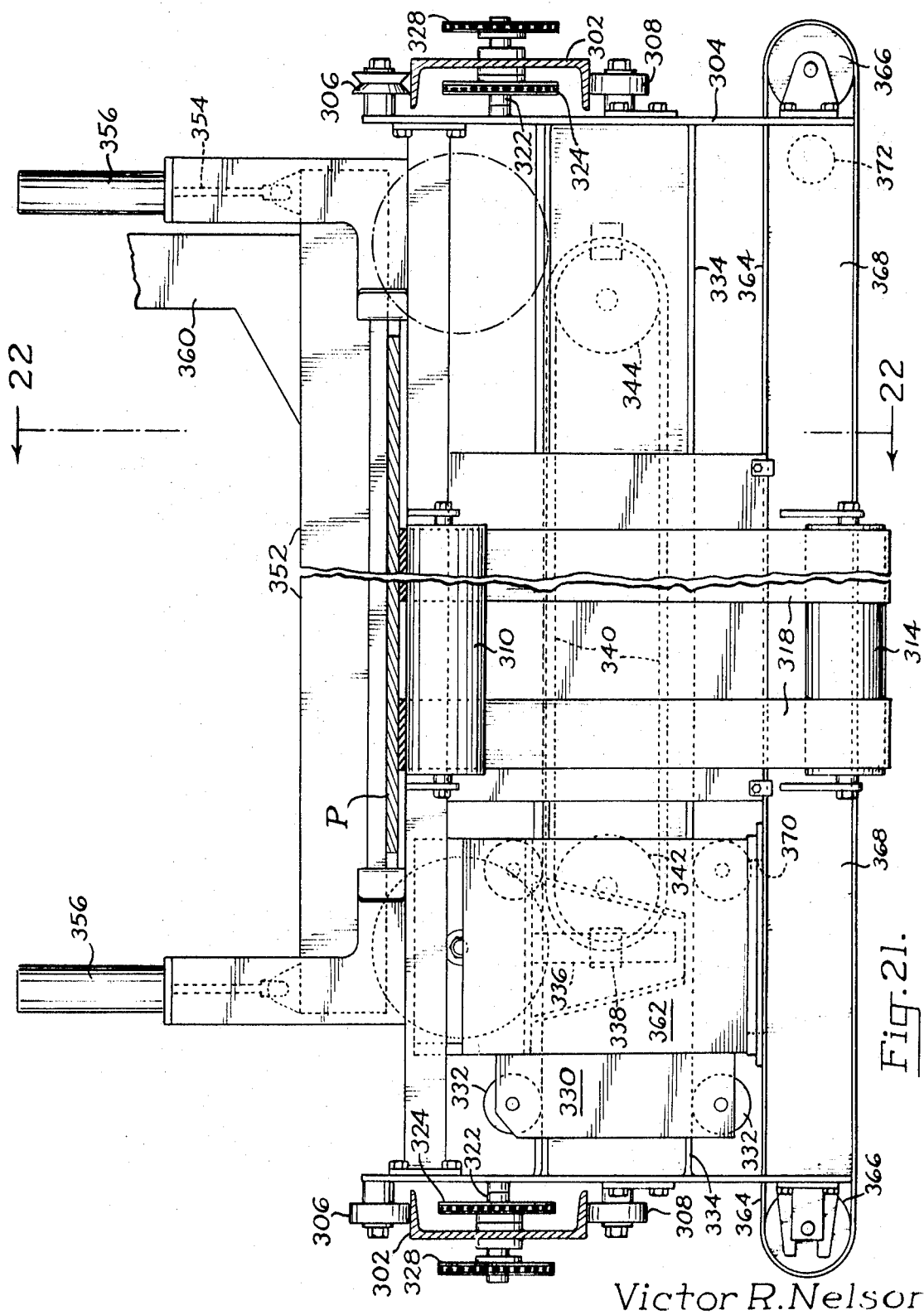
FIG. 21 is a fragmentary foreshortened front elevation of a cutoff unit embodying features of this invention.

Referring primarily to the schematic representation illustrated in FIGS. 1 and 2, the apparatus is composed of a plurality of modular units arranged sequentially to provide for the production of plywood of desired numbers of plies. The arrangement illustrated provides for the production of three ply plywood.

Thus, there is provided a bottom ply layup unit 10 at which bottom veneer plies 12 are arranged end to end on the infeed end of an elongated, continuously moving main conveyor comprising a plurality of belts 14. As the bottom plies move from the layup unit, a glue applicator 16 deposits bonding adhesive over the upper surfaces of the plies.

The main conveyor extends past and underlies a core assembly unit 18 at which random width strips of core veneer 20 are arranged side by side and brought together in edge-abutting relationship to form a continuous sheet of core material. The edge-abutted strips of core material are moved forward continuously in the direction of and substantially at the same speed as the underlying bottom plies. During this movement the continuous sheet of core strips passes by a pair of laterally spaced trim saws 22 (FIG. 2) which function to edge trim the core sheet to desired width. The trimmed core sheet then is delivered to a core transfer unit 24 which functions to deposit the core sheet continuously on the moving bottom plies while substantially maintaining the edge-abutting relationship of the core strips.

The deposited, trimmed sheet then passes under a glue applicator 26 which deposits bonding adhesive to the upper surface of the core sheet.

The subassembly of bottom plies and core sheet is moved forwardly on the main conveyor continuously past the overlay ply layup unit 28 which overlay veneer plies 30 are deposited in end to end relationship upon the core sheet. The overlay veneer plies are arranged with their transverse edges aligned vertically with the transverse edges of the bottom veneer plies.

The three ply assembly thus produced is moved forwardly on the main conveyor to a cutoff unit 32 where a saw functions to cut the continuously moving assembly transversely along the vertically aligned edges of the top and bottom veneer plies. The individual laid-up plywood assemblies severed from the continuous strip then are delivered to a stacker unit 34 where a plurality of the individual assemblies are stacked vertically for subsequent processing.

If it is desired, for example, to produce five ply plywood, the cutoff unit 32 simply is moved forwardly of the overlay panel layup unit 28 sufficiently to interpose between them a second core assembly unit, trim saw assembly, glue applicator assembly, core transfer unit and overlay ply layup unit. In this regard it will be understood that the first overlay ply layup unit serves to deposit the intermediate ply of the five-ply assembly.

From the foregoing it will be understood that seven-ply plywood also may be produced simply by adding a third core assembly unit, trim saw assembly, glue applicator assembly, core transfer unit and final overlay ply layup unit. Thus it will be apparent that the apparatus of the present invention is rendered most versatile by the provision of modular units which may be assembled as desired to provide plywoods of varying numbers of plies.

The bottom ply layup unit 10 includes a framework 36 which supports an endless delivery conveyor, preferably in the form of a pair of laterally spaced conveyor chains 38. The conveyor chains extend substantially normal to and terminate adjacent the main conveyor 14. Between the chains 38 are a pair of longitudinally spaced but aligned roller conveyors 40 and 42 which support the central portion of the veneer plies.

A stack of bottom veneer plies 12 are deposited on the conveyor chains at the end opposite the main conveyor, and then is moved forward to a position adjacent the main conveyor. In this position the stack overlies a vertically adjustable elevator 44 which supports roller conveyor 42 and serves to elevate the stack of plies for convenient transfer of the uppermost ply to the main conveyor. Such transfer is accomplished manually by an operator stationed on the catwalk 46. During manual transfer of the plies from the stack located adjacent the main conveyor, a second stack may be deposited on the outer end of the delivery conveyor, as illustrated. A pair of laterally spaced support members 48 project from the framework above said second stack and serve to support reject plies culled by the operator from the first stack.

The operator places the forward portion of a bottom veneer ply upon the infeed end portion of the main conveyor, and moves the outboard side of the ply into abutment with the fence 50 located adjacent the outboard side of the main conveyor.

As the bottom veneer ply is moved forward by the main conveyor, it passes under a backup roll (FIG. 3) described hereinafter. The leading end of the ply then moved angularly upward over the laterally spaced inclined ramps 52 and into abutment with the stop plate 54 (FIGS. 4 and 5). The plate is mounted on the transverse frame 56 for vertical adjustment relative to the main conveyor. A space is provided between the plate and conveyor to permit passage of the plies.

The transverse frame also supports an arm 58 for pivotal movement on the shaft 60. The arm extends rearward in the longitudinal direction of the main conveyor and supports at its rearward end a pair of rubber rollers 62. The rearward end of the arm is connected pivotally to the projecting end of a piston rod 64 which extends slidably through one end of an elongated air cylinder 66 and is attached at its inner end to a piston within the cylinder. The opposite end of the cylinder is connected pivotally to an upstanding portion of the transverse frame, by means of a pivot pin.

Air under pressure is delivered selectively to the opposite ends of the cylinder to effect reciprocation of the piston rod, and hence pivotal movement of the arm 58. Selective application of air pressure to the cylinder is provided by an electrically actuated valve (not shown), the electric circuit of which includes an electric switch 68 (FIGS. 1 and 4) mounted between spaced belts 14 of the main conveyor adjacent the stop plate 54. The upwardly projecting actuator arm 70 (FIG. 4) of the switch engages the underside of a preceding bottom ply 12, normally holding the switch open and maintaining the air cylinder and roller support arm in the retracted position illustrated in full lines in FIG. 4. However, as the preceding ply moves forward, its trailing end disengages from the arm 70, allowing the latter to move upward to the full line position of FIG. 4. In this position of the arm the switch is closed and the air control valve is actuated to deliver air under pressure to the upper end of the cylinder. The piston rod thus is extended, pivoting the arm clockwise about the shaft and drawing the rollers 62 downward, as illustrated in dash lines in FIG. 4, into contact with the upper surface of the next succeeding bottom veneer ply 12 abutting against the stop member 54. The forward end of said ply thus is pressed downward onto the main conveyor, with its leading end spaced slightly rearward of the trailing end of the next preceding ply.

The electric switch 68 also controls the electric circuit of an electrically actuated applicator 72 (FIGS. 1 and 3) by which a patch 72' of light reflective material is secured to the underside of each bottom veneer ply 12. Typical of such applicators available commercially is the 3-M tape applicator Type 165 manufactured by Minnesota Mining and Manufacturing Company under Catalog No. T-925. The tape has a coating of pressure sensitive adhesive by which it is attached to the ply. The applicator is actuated when the switch 68 is closed by movement of the arm 70 upward to the full line position of FIG. 4. The backup roll 74 referred to previously overlies the applicator and function to support the ply while the patch is applied.

As the bottom veneer ply moves forward under the stop plate 54, it is held against the main conveyor by the forward rubber rollers 76 mounted on the arm 78 pivoted to shaft 60. A rod 80 extends from the arm upwardly freely through an opening in the bracket 82 projecting from the frame 56. A coil spring 84 surrounds the rod between the bracket and extension adjusting nut 86, and urges the rollers downward into resilient engagement with the upper surface of the veneer ply. An adjustable stop nut 88 on the rod above the bracket serves to limit the downward movement of the rollers.

The succession of bottom veneer plies, disposed end-to-end on the main conveyor, move forward through the glue applicator 16. As best illustrated in FIGS. 8 and 9, this applicator includes an upstanding housing 90 disposed transversely across the main conveyor and is open at its longitudinal ends to permit the passage of the main conveyor belts. The housing supports a pair of longitudinally spaced shafts 92 which mount a plurality of rollers 94 over which the main conveyor belts are trained. An intermediate shaft 96, positioned below the shafts, mount a plurality of rollers 98 under which the main conveyor belts are trained. The space between the upper rollers and the intermediate rollers is substantially closed by a transverse glue collector tray 100. The tray is provided with longitudinally spaced, upwardly projecting transverse ribs which reinforce the tray and also provide spaced supports for the bottom veneer plies as the latter move through the glue applicator. The opposite ends of the tray communicate with glue-receiving funnels extending downward from the housing at the lateral sides of the latter. Discharge conduits 102 from the funnels direct the excess glue to a collecting receptacle (not shown).

Adjacent the upper end of the housing and extending transversely of the main conveyor is a glue feed conduit provided with a spray head 104 of conventional construction. The spray head is designed to eject liquid glue under pressure in a transversely wide and longitudinally narrow pattern, onto the upper surface of the bottom veneer plies.

It is to be noted that as each bottom veneer ply enters the infeed side of the glue applicator housing, it is separated from the belt 14 of the main conveyor, as the latter is drawn downward under the intermediate roller 98. However, since the trailing end of the bottom veneer ply still frictionally engages the belt, it is drawn through the glue applicator housing. As the leading end of the ply emerges from the glue applicator housing, it is once again pressed against the main conveyor by means of the ribbed press roller mechanism positioned adjacent the outfeed end of the glue applicator.

As best illustrated in FIGS. 6 and 7, mounts ribbed press roller assembly includes a pair of laterally spaced rollers 106 mounted rotatably on a shaft 108 supported at the forward end of the arm 110. The arm is mounted intermediate its ends for pivotal movement on the shaft 112 which, in turn, is supported by the transverse frame member 114. The rearward end portion 110' of the arm is offset upwardly and is provided with an opening for receiving the shank 116 of the tensioning bolt. This shank extends freely through an opening in the transverse frame member 114, and mounts the compression spring 118. One end of the spring abuts the transverse frame member and the opposite end abuts the adjusting nut 120, by which the tension of the spring may be adjusted. The spring thus serves to urge the arm resiliently counterclockwise, and the adjustment screw 122, threaded through the arm and abutting the transverse frame member, limits the extent of said counterclockwise rotation and hence the lowermost position of the rollers 106 relative to the main conveyor 14.

The rollers 106 are provided with circumferentially spaced, outwardly projecting ribs 106' which are adapted to engage the upper surface of the bottom veneer plies which, at this stage, are coated with bonding adhesive.

The core assembly unit 18 includes a delivery conveyor, preferably similar to that for the bottom veneer plies. Thus, it is composed of a pair of spaced endless chains 124 and intermediate pair of roller conveyors 126 and 128 which support stacks of core material 20 in the form of narrow strips of relatively low grade veneer. This delivery conveyor is disposed substantially parallel to the main conveyor, between the latter and a catwalk 130 which supports an operator. A stack of core material is deposited upon the infeed end of the conveyor and moved rearwardly to the outfeed end where the stack is positioned above a vertically adjustable elevator 132. The elevator serves to raise the stack of core material to a position for convenient access of the uppermost core strips to the operator.

The operator feeds the individual core strips manually to a pair of driven feed rolls 134 which, in turn, feed the strips onto an assembly conveyor comprising laterally spaced belts 136 disposed above and parallel to the main conveyor.

In the event a longitudinal edge of a core strip is uneven or not substantially parallel to the opposite longitudinal edge, or the strip contains knot holes or other undesirable defects, the operator feeds the strip through the rolls 134 in alignment with the rip saw 138, driven by the electric motor 140, to remove the defect or straighten the edge. The resulting scrap piece falls onto the lateral conveyor 142, for delivery to a scrap bin.

The core strips deposited on the assembly conveyor 136 abut at their outboard ends against the travelling fence 144. In the event a strip fails to abut the fence, photocell 146 (FIG. 10) is activated by a light source which passes through the gap between the fence and strip. The cell then functions to activate a pneumatic piston-cylinder unit 148 to extend the piston rod 150 and push the core strip against the fence 144. This fence is provided in the form of an endless belt which moves at the same speed as the assembly conveyor 136, to deliver the core strips to the infeed end of a crowder assembly.

As each core strip is delivered by the assembly conveyor 136 to the infeed end of the crowder assembly, its leading edge abuts against a pair of laterally spaced squaring members 152 (FIGS. 10 and 11). These are the retractable piston rods of pneumatic piston-cylinder units, the cylinder 154 of which are mounted on the frame 156 of the core assembly unit. The squaring members are moved between an extended position for abutment by the leading edge of each core strip and a retracted position above the core strip to allow the latter to pass into the crowder assembly. When the leading edge of a core strip abuts both of the squaring members, said leading edge engages the actuator arm 158 of an electric switch 160 positioned below the core trip. The switch is in the electric circuit of an electrically actuated control valve for the air supply to cylinder 154. When the switch is opened by the leading edge of a core strip, the air cylinders are actuated to retract the squaring members. The leading edge of each core strip thus is aligned normal to the direction of movement of the core strips through the crowder assembly.

The crowder assembly includes a plurality of laterally spaced crowder chains 162 (FIGS. 11 and 12) supported between longitudinally spaced sprocket shafts 164 and 166, and driven at the same speed as the assembly conveyor 136. The upper working stretch of each crowder chain is supported slidably and flexibly on a plurality of short, inverted T-bars 168 (FIGS. 11 and 12). The heads of the bars rest upon an elongated, flexible air tube 169 confined in the elongated housing 170 supported on the frame 156. The leg of each T-bar projects upward through an elongated slot 171 in the housing. The air tube may be pressurized to the extent necessary to provide the desired clamping pressure on the veneer core strip material 20 between the chain 162 and the opposing pressure bar 172. The T-bars thus are individually deflectable, whereby to accommodate variations in thickness of core strip material, without allowing the latter to overlap. Each pressure bar is supported for vertical adjustment by the longitudinally spaced bolts 173, The threaded shanks of which extend through openings in associated brackets 174 on the frame 156. Adjusting nuts 175 on the bolts serve to adjust the bar vertically to provide the proper clearance between it and the crowder chain for frictionally gripping the core strips. The trailing end 172' of each pressure bar is curved arcuately upward to guide the core strips into the space between the bar and the underlying feed chain.

Also mounted on the core unit frame laterally inward of the crowder chains 162 and associated bars 172 are a pair of laterally spaced bars 176 which support between them a plurality of laterally extending, longitudinally spaced idler shafts 177. A gripper wheel 178 is secured to each of the opposite ends of each idler shaft, and is provided on its periphery with a plurality of projecting spikes or sharpened ribs 179 (FIGS. 13) adapted to penetrate the upper surface of the core strip material 20.

Under each wheel 178 is a backing wheel 180 mounted on the upper end of an arm 182. The lower end of the arm is pivoted to a bar 184 secured to frame 156. The arm is movable in the direction to move the wheel 180 toward wheel 178, and the limit of this movement is adjustable by the stop screw 185. Movement of the arm in this direction is urged by spring 186 secured at one end to the arm and at the opposite end to sleeve 187. The sleeve is mounted slidably on an elongated rod 188 and is secured thereto in desired position of adjustment by set screw 189. The rod is movable longitudinally, relative to bar 184, in end guide sleeves 190 secured to the bar, and is secured in desired position of adjustment by set screws 191. Thus, the clamping pressure of each backing wheel 180 may be adjusted by its associated sleeve 187, and the clamping pressure of the entire assembly of backing wheels then may be adjusted by moving the rod 188.

It is by means of the foregoing arrangement of wheels 178 and 180 that each core strip is prevented from becoming displaced angularly as it is moved through the crowder chain portion of the crowder assembly.

The aligned core strips are delivered by the crowder chains 162 of the crowder assembly to an outfeed chain section composed of a plurality of laterally spaced bottom outfeed chains 192 and associated top outfeed chains 194 mounted on longitudinally spaced sprockets shafts 196 and 198, respectively. The outfeed chains are driven at a speed slightly slower than the crowder chains 162, whereby to effect crowding of the core strips into edge-abutting relationship in the crowder chain section. An electric switch 200 is positioned between the crowder chains and outfeed chains. The switch functions by movement of its actuator arm into the space between longitudinally spaced core strips, to momentarily stop the outfeed chains so as to close said space. This insures positive edge abutment between core strips.

The working stretches of the lower outfeed chains 192 are backed by pressure bars 202 (FIGS. 11 and 14) supported on the piston rods 204 of the air cylinder units 206 mounted on the frame 156. The working stretches of the upper outfeed chains 194 are backed by pressure bars 208 supported from the frame by the threaded adjustment bolts 210.

As the edge-abutting core strips 20 progress through the outfeed chain section, they pass by a pair of laterally spaced trim saws 22, driven by the electric motors 212. These trim saws function to trim the continuous sheet of edge-abutting core strips to desired width. In this manner, bonding adhesive subsequently applied to the top surfaces of the core material, is not wasted on the scrap material removed by the trim saws. This eliminates the significant cost factor in plywood production since bonding adhesive is costly.

The trimmed, continuous sheet of core material 20 is delivered continuously by the outfeed chains to the core transfer unit 24 which functions to deposit the core sheet upon the continuously moving bottom plies 12. The transfer unit (FIGS. 15–18) includes a hollow vacuum box 214 which is connected through the conduit 216 to the suction inlet of a centrifugal fan 218. The fan is driven rotationally by the electric motor 220 mounted on the frame 222. The vacuum box connects to a pair of laterally spaced, longitudinally elongated vacuum chambers 224. The bottom side of each chamber is curved arcuately in a shallow S configuration, terminating at its rearward, upper end rearward of the outfeed end of the outfeed chains 192, 194 and at its forward, lower end immediately above the main conveyor belts 14. The bottom side of each chamber is provided with a narrow slot 226 (FIGS. 17 and 18) extending substantially its full length. Front and rear rollers 228 and 230, respectively, mounted on each chamber, support an endless, flexible conveyor belt 232. The sides of the working stretch of the belt slidably engage guide members 234 which conform the belt to the curvature of the bottom side of the chamber.

Each belt 232 is provided with a plurality of longitudinally spaced, elongated openings 236 which register with the slot 226 in the chamber. Each elongated opening in the belt is surrounded by longitudinal and transverse ribs 238 and 240, respectively, which project from the outer surface of the belt to define a substantially rectangular vacuum cup. The belt, including the ribs, is made of flexible material such as rubber or synthetic thermoplastic material which may be reinforced transversely by the reinforcing rods 242 in the transverse ribs. However, the material is sufficiently resilient as to allow the projecting ribs to deform to the contour of the abutting surface of the core material 20 to provide a vacuum seal therebetween. The continuous sheet of core material thus is supported by the laterally spaced belts 232 by the partial vacuum provided in the chambers 224.

The endless transfer belts are driven by the front rolls 228 which are connected through the differential gear unit 244, drive rod 246 and differential gear unit 248 to the shaft 198 which mounts the forward sprockets of the outfeed chains 194. The transfer belts thus are driven at the same speed as the outfeed chains and at the same speed as the main conveyor 14. Accordingly, when the individual core strips reach the front end of the slotted chambers and thus are removed from the influence of the partial vacuum, they are transferred onto the upper surface of the bottom plies 12 while substantially maintaining their edge-abutting relationship.

The rearward end of the transfer unit is mounted pivotally on the laterally spaced, horizontal shafts 250 secured to a bracket 252 depending from the frame 222. These shafts are received in bearings 254 secured to the laterally spaced chambers 224. Since the latter extend rearward under the upper shaft 198 which supports the outfeed chain sprockets, said shaft also supports the idler guide spools 256 which guide the upper stretches of the belts 232.

The forward end of the transfer unit is supported adjustably above the main conveyor 14 by means of the rod 258. This rod is connected pivotally at its lower end to the differential gear unit 244 and extends upward freely through an opening in the transverse frame member 260. This upper portion of the rod is threaded for the reception of the adjustment nut 262 which overlies the frame member. Rotation of the nut thus effects raising or lowering of the forward end of the transfer unit relative to the main conveyor.

In the modified form of transfer unit illustrated in FIGS. 19 and 20, the vacuum system previously described is replaced by laterally spaced pairs of endless gripper chains. Each pair includes a main chain 264 trained about front and rear sprockets 266 and 268, respectively, and the intermediate guide bar 270. The rear sprockets are secured to the upper outfeed chain shaft 198 and are of the same size as the outfeed chain sprockets. The rearward end of each guide bar is supported by the shaft 198. The forward sprockets are driven by such means as the drive assembly illustrated in FIGS. 15 and 16. The bottom edge of the guide bar 270 is curved arcuately and cooperates with the forward sprocket 266 to provide the working stretch of the chain with a shallow S configuration. A tensioning sprocket 272 on the guide bar provides proper tension for the chain.

Each pair of gripper chains also includes a backup idler chain 274 mounted on the backup chain bar 276 secured to frame 222 by means of the shaft 278. The chain extends over a rear sprocket 280 and a tensioning sprocket 282, as illustrated, and the upper edge of the bar is curved to match the curvature of the confronting edge of the main bar. The rear sprocket 280 is secured to the lower outfeed chain shaft 196 which also supports the rearward end of the bar 276.

The links of the chains 264 and 274 are provided with outwardly projecting spikes 284 (FIG. 20) which function to engage the core strip material 20 as the latter is delivered from the outfeed chains. As the core strips are released from between the forward ends of the chains they are deposited freely upon the upper surfaces of the continuously moving bottom plies 12.

Referring again to FIG. 2, the subassembly of adhesive coated bottom plies 12 and trimmed core sheet of edge-abutting core strips 20 are moved forward on the main conveyor 14 toward the overlay ply layup unit 28. During this movement the glue applicator 26 applies bonding adhesive to the upper surface of the core strips, as previously explained.

The glue applicator 26 may be similar to the glue applicator 16 previously described, with the exception that the main conveyor belts 14 need not be deflected downward under a glue collecting tray 100. This is so because the bonding adhesive is applied in applicator 26 to the upper surfaces of the core strip material 20 which is disposed in edge-abutting relationship. Accordingly, glue cannot be deposited upon the main conveyor belts, as distinguished from that possibility at glue applicator 16.

The overlay ply layup unit 28 includes a delivery conveyor 286, 288 and 290, vertically adjustable elevator 292 and operator catwalk 294, similar to the bottom ply layup unit previously described. At this station the operator on the catwalk lifts the uppermost ply sheet 30 from the stack, slides the far end onto the transverse bar 296 above the main conveyor 14 and then moves the sheet laterally against the travelling fence 298. He then aligns the leading edge of the ply with the leading edge of the underlying bottom ply 12 and presses the overlay ply onto the core layer and holds it there as the assembly moves forward. The trailing end of the overlay ply finally drops from the bar onto the upper, adhesive-coated surface of the core sheet. As this procedure is repeated for subsequent overlay ply sheets, the latter are arranged in end-to-end relationship, corresponding to the end-to-end relationship of the bottom ply sheets.

As the laid-up assembly progresses from the overlay ply layup unit, the light-reflective patch 72' on the underside of the leading bottom ply 12 registers with a combination electric lamp and photo cell unit 300 mounted under the main conveyor between spaced belts 14 adjacent the cutoff unit 32. The photo cell completes the electric circuit of the cutoff unit to effect transversal of a cutoff saw across the laid-up assembly to sever the latter transversely along the line of registration of the transverse edges of the bottom and top veneer plies.

Figure 22:
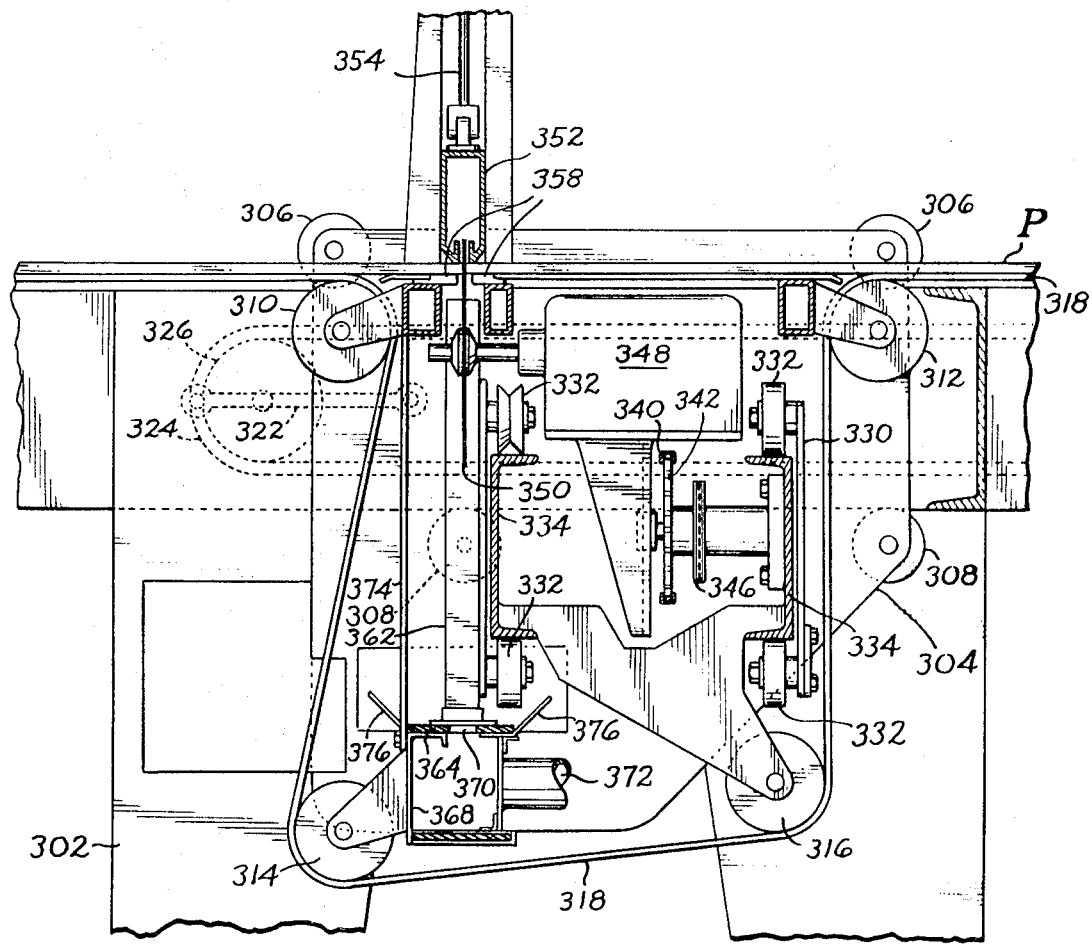
FIG. 22 is a fragmentary sectional view taken along the line 22—22 in FIG. 21.

Referring particularly to FIGS. 21 and 22 of the drawings, the cutoff unit includes a supporting frame 302 on which is mounted a longitudinally movable carriage 304. Upper rollers 306 mount the carriage on the frame, and lower rollers 308 engage the lower edges of the laterally spaced longitudinal frame members of the frame 302 to stabilize the carriage during movement.

The carriage 304 supports shafts which mount the upper, longitudinally spaced belt pulleys 310 and 312 and the lower, longitudinally spaced belt pulleys 314 and 316 about which the continuous belts 318 are trailed. As the carriage is moved longitudinally, the transverse trough in the belts formed by the pulleys 310–316 moves longitudinally with the carriage. These belts are driven by pulleys secured to the same shaft 320 (FIG. 2) that mounts the forward end pulleys of the main conveyor belts. The pulleys are of the same size, whereby all belts are moved at the same speed. Accordingly, belts 318 are understood to be a part of the main conveyor 14.

The carriage is reciprocated in the longitudinal direction of the belts by its pivoted connection through the links 322 to the laterally spaced endless chains 324. These chains are mounted on pairs of sprockets 326, and one of each pair is connected by an external sprocket 328 and chain to a common drive motor (not shown).

A subcarriage 330 is mounted on the main carriage for movement transversely of the belts 318 within the trough defined by the belt pulleys. Spaced rollers 332 on the subcarriage engage track members 334 on the main carriage for this purpose. The subcarriage is provided with a vertical slot 336 in which the connecting block 338 reciprocates. The block is connected pivotally to an endless chain 340 mounted on the transversely spaced sprockets 342 and 344 on the main carriage. One of these sprockets 342 is driven through a sprocket 346 by a suitable electric motor (not shown). Thus, upon driving of the chain 340 the subcarriage is reciprocated transversely of the belts, the block 338 sliding vertically in the slot to accommodate its movement selectively with the upper and lower stretches of the chain.

The subcarriage mounts an electric motor 348 which supports a circular cutoff saw 350 on its driven shaft. A portion of the saw projects above the plane of the upper surfaces of the belts 318 upon which the veneer ply assemblies P are supported, to effect cutting of the assemblies. The subcarriage reciprocates sufficiently to move the saw laterally beyond the sides of the ply assembly, as illustrated in FIG. 21.

Means is provided for holding the ply assembly securely during the cutting operation. In the embodiment illustrated, a transversely elongated, hollow holddown member 352 is supported at its opposite ends by the extending piston rods 354 of the pneumatic piston-cylinder units. The cylinders 356 are supported by vertical extensions of the main carriage. By actuation of the piston-cylinder units the holddown member is adjustable vertically between an upward, retracted position and the downward, clamping position in which the lower side of the holddown member presses against the upper surfaces of the ply assemblies. The latter thus are compressed and held securely against the underlying, longitudinally spaced transverse anvils 358 supported by the main carriage.

The circular saw blade projects upwardly between the anvils and into the open slotted overlay of the holddown member. The latter communicates with a duct 360 which, end turn, connects to a vacuum fan (not shown). By this means, sawdust produced during the cutting operation is conveyed through the hollow holddown member and vacuum duct to a suitable place of storage.

The lower portion of the cutoff saw is confined within a downwardly extending hollow chamber 362 mounted for movement with the subcarriage. The bottom end of the chamber is secured to an endless belt 364 which is mounted on the laterally spaced idler pulleys 366 carried by the main carriage. Between the upper and lower stretches of the belt is a transversely elongated collector box 368. This box is open at its upper end and communicates with the chamber 362 through registering openings 370 in the belt and bottom end of the chamber. A vacuum duct 372 communicates the collector box with a vacuum fan (not shown) for removing sawdust which falls downward from the saw through the chamber and into the collector box.

A vertical deflector plate 374 on the main carriage extends downward to the collector box a spaced distance forwardly of the chamber 362. This deflector plate functions to direct slivers of core material which may be produced during the cutting operation, downwardly onto the upper surface of the belt 364, from whence the slivers are delivered to scrap bins (not shown) one of which is located at each end of the belt. Retainer plates 376 project angularly upward from the opposite sides of the collector box, to keep such slivers on the belt during movement toward the bins.

Actuation of the cutoff unit is initiated by the photocell 300 in the main circuit of the cutoff unit as previously mentioned. The photocell is so positioned that when it senses the light reflected by the patch, the transverse ends of adjacent bottom and top plies are aligned with the cutoff saw. At this instant the pneumatic piston-cylinder units 356 are activated to lower the holddown member 352 and clamp the ply assemblies to the underlying anvils 358. The drive motors for the main and subcarriages also are energized to move the main carriage longitudinally forward and the subcarriage transversely across the main carriage. When the cutoff saw has traversed and severed the ply assemblies, the subcarriage drive motor is deenergized to stop the movement of the subcarriage at the end of the main carriage opposite that from which it started. The pneumatic piston-cylinder units then are actuated to retract the holddown member 352 to release the severed ends of the adjacent ply assemblies.

The drive motor for the main carriage continues to operate to retract the main carriage rearwardly to its initial position, where it is stopped. The cutoff cycle thus is completed. The next cycle of operation of the cutoff unit is initiated when the patch 72' on the next succeeding bottom veneer ply 12 registers with the lamp and photocell unit 300. The foregoing sequence of operations thus is repeated, the subcarriage being driven in the opposite direction from its previous traversal of the main carriage, as will be understood.

The severed lengths of laid-up ply assemblies P then progress forward on the conveyor belts and are delivered to the stacking unit 34. Here the assemblies are stacked vertically to a predetermined number, whereupon the stack is transferred to a press for subsequent processing.

Figure 23:
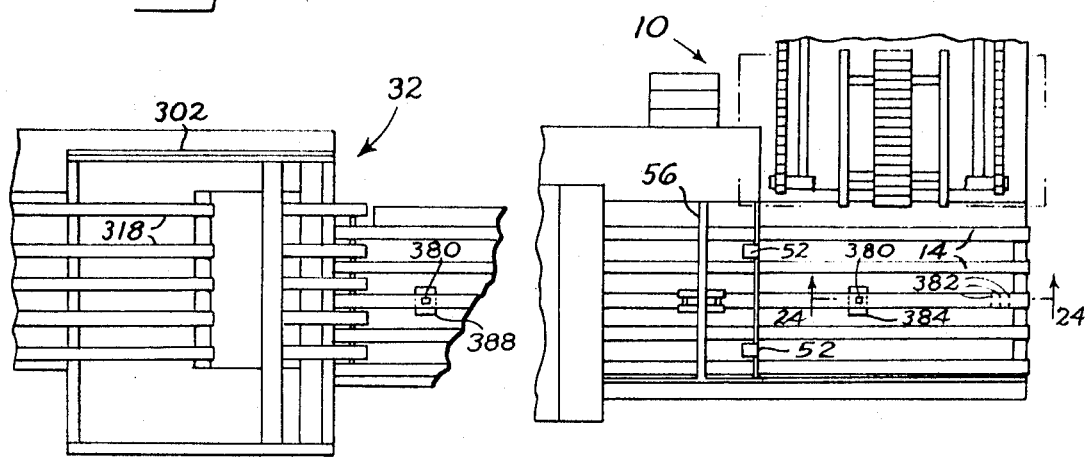
FIG. 23 is a fragmentary foreshortened plan view illustrating alternative means for activating the cutoff saw unit.
Figure 24:
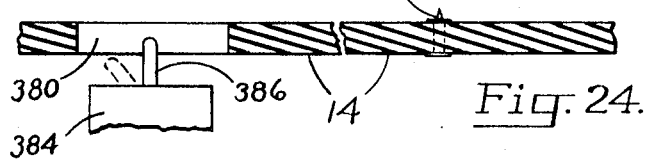
FIG. 24 is a fragmentary sectional view taken on the line 24—24 in FIG. 23.

Various means may be employed for initiating the activation of the cutoff unit, other than the cooperative arrangement of the lamp and photo cell unit 300 and light-reflective patches 72' previously described. One such alternative arrangement is illustrated in FIGS. 23 and 24. In this embodiment the central belt 14 of the main conveyor is provided with a plurality of openings 380 spaced apart longitudinally a distance substantially equal to the length of the bottom veneer plies 12. The central belt also is provided with a plurality of upwardly projecting spikes 382 spaced apart on opposite sides of each opening 380 for engagement by the leading and trailing ends of each bottom veneer ply. Each ply thus is secured to the main conveyor at both ends, and this is achieved by the press rolls 62, 76 and 106 previously described.

In this embodiment the air cylinder 66 is controlled by an electric switch 384 the upwardly projecting actuator arm 386 of which is arranged for registration with the openings 380 in the central belt 14.

As one bottom ply is being impaled upon the spikes 382 and moved forwardly with the main conveyor, the operator places a succeeding ply over the trailing portion of the preceding ply. The succeeding ply thus is moved into abutment with the stop member 54. As the preceding ply moves from under the succeeding ply, the next succeeding opening in the belt again effects actuation of the switch 384 to activate the air cylinder and pivot the arm 58 the moving the press rollers 62 downward to impale the leading end of the succeeding ply upon the spikes on the main conveyor belt. In this manner the space between the trailing end of a preceding bottom veneer ply and the leading end of the next succeeding ply, is maintained at a constant minimum.

As the electric switch 384 is opened, upon passage of the belt opening 380 beyond the switch actuator arm, the air pressure control valve is moved to connect the bottom end of the cylinder to air pressure. The piston in the cylinder functions rapidly to retract the piston rod and rotate the arm counterclockwise to the position illustrated in full lines in FIG. 4.

As each bottom veneer ply approaches the cutoff unit 32, an electric switch 388 in the main circuit of the cutoff unit and positioned under the main conveyor in alignment with the openings 380 in the center belt 14, functions to activate the cutoff unit.

It is to be noted from the foregoing that the production of plywood by means of the apparatus described requires only one operator for each ply. If desired, the initial feeding of these ply materials may be effected by automatic equipment. Thus, the requirement for operating personnel maintained at a minimum or eliminated entirely. Additional cost savings are realized by eliminating waste of core strip material and adhesive by eliminating incomplete coverage of adhesive, by minimum usage of bonding adhesive by pretrimming the core sheet, and by assembling the core strips into a continuous sheet without the costly use of connecting tapes, strings, or other material which subsequently must be discarded. Maximum quality of production is achieved by maintaining the substantially edge-abutting relationship of the core strips and by complete coverage of the strips with adhesive.

It will be apparent to those skilled in the art that various changes in the size, number, type and arrangement of parts described hereinbefore may be made without departing from the spirit of this invention and the scope of the appended claims.

Having thus described my invention and the manner in which it may be used, I claim:

1. Apparatus for laying up veneer plies for making plywood, comprising
    a. an elongated main conveyor movable in an outfeed direction,
    b. bottom ply layup means adjacent the infeed end of the main conveyor for depositing on the latter bottom veneer plies arranged end-to-end,
    c. core ply layup means adjacent the bottom ply layup means and including
        1. a core strip assembly conveyor for receiving core strips thereon,
        2. core strip crowder conveyor means above the main conveyor for assembling core ply strip material freely in edge-abutting relationship to form a substantially continuous core ply sheet, and
        3. core strip aligning means between the assembly conveyor and the crowder conveyor means for aligning the leading edge of each core strip substantially normal to the direction of movement of the core strips through the crowder conveyor means,
    d. core ply transfer conveyor means adjacent the core strip crowder conveyor means for transferring the core ply sheet onto the upper surface of the bottom veneer plies, the transfer conveyor means having an infeed end registering with the outfeed end of the crowder conveyor means and an outfeed end positioned above and closely adjacent the main conveyor,
    e. the transfer conveyor means including means for securing the core ply strip material to substantially maintain said edge-abutting relationship during transfer to the main conveyor,
    f. overlay ply layup means adjacent the outfeed end of the core ply transfer conveyor means for depositing on the core sheet overlay veneer plies arranged end-to-end alignment with the bottom veneer plies, and
    g. cutoff means adjacent the outfeed end of the overlay ply layup means for cutting the completed laid-up ply assembly transversely along the adjacent ends of the bottom and overlay veneer plies.

2. The apparatus of claim 1 including rip saw means adjacent the core strip assembly conveyor for trimming the core strips lengthwise prior to deposit on the assembly conveyor.

3. The apparatus of claim 1 wherein the means for aligning the leading edge for each core strip comprises
    a. squaring means mounted for movement between an extended position intercepting said leading edge for effecting said alignment and a retracted position removed from said core strip, and
    b. squaring actuator means operable by the core strip upon alignment of the latter to move the squaring means to said retracted position.

4. The apparatus of claim 1 wherein the crowder conveyor means also includes means for securing the aligned core strips against displacement as they move with the conveyor.

5. The apparatus of claim 4 wherein the means for securing the aligned core strips comprises a plurality of longitudinally spaced pairs of rolls having core strip gripping surfaces, the rolls of each pair being spaced apart laterally and secured together for simultaneous rotation.

6. The apparatus of claim 1 wherein the transfer conveyor means comprises
    a. perforate endless conveyor belt means,
    b. means mounting each belt means for movement in the direction and at substantially the same speed as the main conveyor, and
    c. vacuum chamber means communicating each working stretch of the perforated belt means with a source of vacuum, whereby to secure core strip material from the crowder conveyor means to the perforated belt means by said vacuum.

7. The apparatus of claim 1 wherein the transfer conveyor means comprises
    a. a pair of endless conveyor chains arranged with working stretches facing each other,
    b. means mounting the chains for movement in the direction of and at substantially the same speed as the main conveyor, and
    c. gripper means on the chains adapted to secure between said working stretches core strip material from the crowder conveyor means.

8. The apparatus of claim 1 wherein the cutoff means comprises a. a main carriage mounted for reciprocative movement in the direction of movement of the main conveyor,
b. guide means on the main carriage engaging the main conveyor and forming a depression in the latter which moves with the main carriage, and
c. a cutoff saw mounted on the main carriage for reciprocative movement transversely of the main conveyor, the saw extending across the plane of the main conveyor in the area of said depression.

9. Apparatus for laying up veneer plies for making plywood, comprising
   a. an elongated main conveyor movable in an outfeed direction,
   b. bottom ply layup means adjacent the infeed end of the main conveyor for depositing on the latter bottom veneer plies arranged end to end,
   c. core ply layup means adjacent the bottom ply layup means and including core strip crowder conveyor means above the main conveyor for assembling core ply strip material freely in edge-abutting relationship to form a substantially continuous core ply sheet,
   d. core ply transfer conveyor means adjacent the core strip crowder conveyor means for transferring the core ply sheet onto the upper surface of the bottom veneer plies, the transfer conveyor means having an infeed end registering with the outfeed end of the crowder conveyor means and an outfeed end positioned above and closely adjacent the main conveyor,
   e. the transfer conveyor means including means for securing the core ply strip material to substantially maintain said edge-abutting relationship during transfer to the main conveyor,
   f. overlay ply layup means adjacent the outfeed end of the core ply transfer conveyor means for depositing on the core sheet overlay veneer plies arranged end to end in alignment with the bottom veneer plies,
   g. cutoff means adjacent the outfeed end of the overlay ply layup means for cutting the completed laid-up ply assembly transversely along the adjacent ends of the bottom and overlay veneer plies,
   h. cutoff unit control means including an electric switch having an actuator positioned adjacent the infeed end of the cutoff unit,
   i. a plurality of switch operator means spaced apart longitudinally on the main conveyor for association each with successive bottom plies,
   j. the switch actuator being positioned for successive engagement by the plurality of switch operator means to activate the cutoff unit to sever the laid-up ply assembly transversely along the adjacent ends of bottom and overlay veneer plies.

10. The apparatus of claim 9 wherein the cutoff unit control and actuator means comprises
    a. electrically actuated applicator means located under the main conveyor adjacent the bottom ply layup means for applying to the underside of each bottom ply a light-reflective material,
    b. switch means associated with the applicator means arranged to be operated by each bottom ply as the latter is moved by the main conveyor,
    c. an electric actuator for the cutoff means, and
    d. light sensitive operator means for the cutoff actuator arranged adjacent the latter for activation by the light-reflective material on each bottom ply to actuate the cutoff means to sever the laid-up ply assembly along the adjacent transverse edges of the bottom and overlay plies.

11. Apparatus for laying up veneer plies for making plywood, comprising
    a. an elongated main conveyor movable in an outfeed direction,
    b. bottom ply layup means adjacent the infeed end of the main conveyor for depositing on the latter bottom veneer plies arranged end to end,
    c. core ply layup means adjacent the bottom ply layup means and including core strip crowder conveyor means above the main conveyor for assembling core ply strip material freely in edge-abutting relationship to form a substantially continuous core ply sheet,
    d. core ply transfer conveyor means adjacent the core strip crowder conveyor means for transferring the core ply sheet onto the upper surface of the bottom veneer plies, the transfer conveyor means having an infeed end registering with the outfeed end of the crowder conveyor means and an outfeed end positioned above and closely adjacent the main conveyor,
    e. the transfer conveyor means including means for securing the core ply strip material to substantially maintain said edge-abutting relationship during transfer to the main conveyor,
    f. first glue applicator means disposed upstream from the transfer conveyor means for applying bonding adhesive to the upper surface of the bottom veneer plies, the first glue applicator means including
       1. guide means engaging the main conveyor and deflecting the latter downward to form a transverse depression therein,
       2. glue collector means extending across said depression above the main conveyor for shielding the latter, and
       3. glue spray means mounted above the glue collector means for depositing bonding adhesive on the upper surface of the bottom veneer plies,
    g. second glue applicator means disposed downstream from the transfer conveyor means for applying bonding adhesive to the upper surface of the core ply strips,
    h. overlay ply layup means adjacent the outfeed end of the core ply transfer conveyor means for deposition on the core sheet overlay veneer plies arranged end-to-end in alignment with the bottom veneer plies, and
    i. cutoff means adjacent the outfeed end of the overlay ply layup means for cutting the completed laid-up ply assembly transversely along the adjacent ends of the bottom and overlay veneer plies.

12. Apparatus for laying up veneer plies for making plywood, comprising
    a. an elongated main conveyor movable in an outfeed direction,
    b. bottom ply layup means adjacent the infeed end of the main conveyor for depositing on the latter bottom veneer plies arranged end to end,
    c. stop means adjacent the bottom ply layup means arranged for abutment by bottom veneer plies on the main conveyor,
    d. bottom veneer ply release means associated with the stop means for releasing a bottom ply from abutment with the stop means for movement with the main conveyor when the trailing end of a preceding bottom ply moves forward of the leading end of the next succeeding bottom ply,
    e. core ply layup means adjacent the bottom ply layup means and including core strip crowder conveyor means above the main conveyor for assembling core ply strip material freely in edge-abutting relationship to form a substantially continuous core ply sheet,
    f. core ply transfer conveyor means adjacent the core strip crowder conveyor means for transferring the core ply sheet onto the upper surface of the bottom veneer plies, the transfer conveyor means having an infeed end registering with the outfeed end of the crowder conveyor means and an outfeed end positioned above and closely adjacent the main conveyor,
    g. the transfer conveyor means including means for securing the core ply strip material to substantially maintain said edge-abutting relationship during transfer to the main conveyor,
    h. overlay ply layup means adjacent the outfeed end of the core ply transfer conveyor means for depositing on the core sheet overlay veneer plies arranged end to end in alignment with the bottom veneer plies, and i. cutoff means adjacent the outfeed end of the overlay ply layup means for cutting the completed laid-up ply assembly transversely along the adjacent ends of the bottom and overlay veneer plies.

13. The apparatus of claim 12 wherein the release means comprises
   a. bottom ply support means extending above the main conveyor adjacent the stop means for elevating the leading end of a bottom veneer ply above the main conveyor into abutment with the stop means,
   b. movable press means adjacent the stop means and above the main conveyor operable to press said elevated leading end of a bottom veneer ply onto the main conveyor,
   c. electric actuator means for the movable press means, and
   d. electric switch means associated with the actuator means and operable when the trailing end of a preceding bottom ply moves forward of the leading end of a next succeeding bottom ply to activate the actuator means and move the press means downward to press said elevated leading end of the bottom ply onto the main conveyor.

14. The apparatus of claim 13 wherein the electric switch means has an actuator positioned for engagement by a bottom veneer ply supported on the main conveyor.

15. The apparatus of claim 13 wherein the electric switch means has an actuator positioned for engagement by the main conveyor, and a plurality of operator means are disposed on the main conveyor at longitudinally spaced intervals for successive engagement with the switch actuator means.